(12) United States Patent
Desai et al.

(10) Patent No.: US 8,573,820 B2
(45) Date of Patent: Nov. 5, 2013

(54) MODULAR LED BASED AIRCRAFT REAR POSITION LIGHT

(75) Inventors: Raghuveer H. Desai, Bangalore (IN); Anita Sure, Bangalore (IN); Bo Stout, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 23 days.

(21) Appl. No.: 13/281,849

(22) Filed: Oct. 26, 2011

(65) Prior Publication Data

US 2013/0107553 A1 May 2, 2013

(51) Int. Cl.
*B64D 47/06* (2006.01)
(52) U.S. Cl.
USPC .......................................... 362/470; 362/247
(58) Field of Classification Search
USPC .......................... 362/241, 247, 470, 471, 472; 340/815.45
See application file for complete search history.

(56) References Cited

U.S. PATENT DOCUMENTS

| | | | |
|---|---|---|---|
| 6,183,100 B1 * | 2/2001 | Suckow et al. | 362/471 |
| 6,244,728 B1 | 6/2001 | Cote et al. | |
| 7,118,261 B2 * | 10/2006 | Fredericks et al. | 362/470 |
| 7,314,296 B2 | 1/2008 | Machi et al. | |
| 7,434,970 B2 | 10/2008 | Machi et al. | |
| 7,566,154 B2 * | 7/2009 | Gloisten et al. | 362/247 |
| 7,918,592 B2 | 4/2011 | Barnett et al. | |
| 8,192,060 B2 * | 6/2012 | Wilkinson et al. | 362/470 |
| 2003/0164666 A1 | 9/2003 | Crunk | |
| 2005/0237735 A1 | 10/2005 | Fan | |
| 2006/0007677 A1 * | 1/2006 | Israel et al. | 362/227 |
| 2009/0140660 A1 | 6/2009 | Fossum et al. | |

FOREIGN PATENT DOCUMENTS

GB 819727 9/1959

* cited by examiner

*Primary Examiner* — Y My Quach Lee
(74) *Attorney, Agent, or Firm* — Ingrassia Fisher & Lorenz, P.C.

(57) ABSTRACT

A rear position light-emitting diode (LED) light module for use on an aircraft. The light module includes a single printed circuit board (PCB), at least one light emitting diode attached to a first surface of the PCB and a single reflector and baffle device attached to the PCB. The baffle device provides an illumination pattern having a predefined angular pattern in the first plane. The illumination pattern does not overlap with light illuminated by port and starboard position lights of the aircraft. The baffle device includes a base section being planar, the base section comprises a cavity, first and second side sections attached to a first surface of the base section on opposing sides of the cavity, the first and second side sections intersect the first plane but not the second plane and a plurality of snap fittings attached to a second side of the base section.

10 Claims, 5 Drawing Sheets

MODULAR LED BASED AIRCRAFT REAR POSITION LIGHT

BACKGROUND OF THE INVENTION

In order to prevent collisions with other aircraft, a variety of lights are mounted on the exterior of an aircraft in order to indicate its relative position to the other aircraft in the same general airspace. Such lighting systems include a rear (or aft) position lighting system, which typically includes a white light installed on the aft of an aircraft. The aircraft's lighting systems also include forward position lights, comprising a red light on the port wing and a green light on the starboard wing. Other aircraft operating in the vicinity of the lighted aircraft can discern the relative position and direction of travel of the lighted aircraft based on the color and movement of the rear and forward position lighting systems.

U.S. Federal Aviation Regulations (FARs) specify minimum and maximum light intensities for each of the rear and forward position lights, as a function of the angle of emission. The limitations for maximum intensities, known as "angular cut-offs," are necessary to prevent excess overlap between these position lights so that other aircraft in the same general airspace can accurately discern between the individual position lights of an aircraft. This assists the other aircraft in determining the relative position of the lighted aircraft.

Traditionally, rear (as well as forward) position lighting systems have utilized incandescent lamps as light sources. These systems suffer from several disadvantages. Due to their principles of operation, incandescent lamps have a limited life compared to other light sources (e.g., fluorescent, solid-state, and high intensity discharge lights). The harsh environment under which an aircraft operates can further reduce the life of incandescent lamps. Since aviation safety regulations require that the aircraft's position lights be functioning when the aircraft is operating at night, the frequent failures of incandescent positioning lights may result in delayed flight departures as well as high maintenance costs due to replacement.

Some existing position lighting systems utilize light emitting diodes (LEDs). These lighting systems require clusters of LEDs on multiple printed circuit boards in order to meet the FAR requirements, thereby adding to their cost. Also, Rear Position Lights (RPLs) include masking on an outer lens in order to avoid light entering into overlap areas. This masking/coating sometimes gets peeled off, thus failing to meet the requirements with regard to angular range of illumination.

Other existing RPLs incorporate an overlap area baffle into the lens retainer or housing. These overlap baffles may be located on separate assemblies from the light-emitting diode (LED) module and LED printed circuit boards (PCBs). This means each new version of the RPL must have a new baffle designed even if it uses the same core LED lighting module.

SUMMARY OF THE INVENTION

The present invention provides a rear position light-emitting diode (LED) light module for use on an aircraft. The rear position LED light module incorporates a baffle into the reflector design in order to meet overlap requirements without paint or ceramic on a lens, or any other form of secondary baffle or light masking.

So for instance, because the baffle is integrated into the LED lighting module, a new baffle does not need to be designed and added for each new form of the rear position light that would use the module.

An exemplary light module includes a single printed circuit board (PCB), at least one light emitting diode attached to a first surface of the PCB and a single reflector and baffle device attached to the PCB. The single reflector and baffle device provides an illumination pattern having a predefined angular pattern in the first plane.

In one aspect of the invention, the illumination pattern has a second predefined angular pattern in a second plane. The second plane is perpendicular to the first plane.

In another aspect of the invention, the predefined angular pattern in the first plane is configured to provide an illumination pattern that does not overlap with light illuminated by port and starboard position lights of the aircraft.

In still another aspect of the invention, the single reflector and baffle device includes a base section being planar, the base section comprises a cavity, first and second side sections attached to a first surface of the base section on opposing sides of the cavity, the first and second side sections intersect the first plane but not the second plane and a plurality of snap fit attachment devices attached to a second side of the base section. The snap fit attachment devices are removeably received by the PCB. The snap fit attachment devices include a flange configured to engage with a second surface of the PCB.

In yet another embodiment, the present invention can fit into any existing lamp, without redesign. The light module can be rotated to a variety of angles to accommodate existing lamp assemblies without lens or existing baffle redesigns.

In yet other embodiment, the present invention can be used in any existing lamp, along with other modules doing function of any other aircraft lamp like forward position light, white anti-collision light etc.,

BRIEF DESCRIPTION OF THE DRAWINGS

Preferred and alternative embodiments of the present invention are described in detail below with reference to the following drawings:

FIGS. 4-1 and 4-2 are perspective views of a reflector used in the light module of FIG. 1.

DETAILED DESCRIPTION OF THE INVENTION

The present invention is a rear position light-emitting diode (LED) light module for use on a vehicle, such as an aircraft. The rear position LED light module incorporates a baffle into the reflector design in order to meet overlap requirements without paint or ceramic on a lens, or any other form of secondary baffle or light masking.

Figure 1:
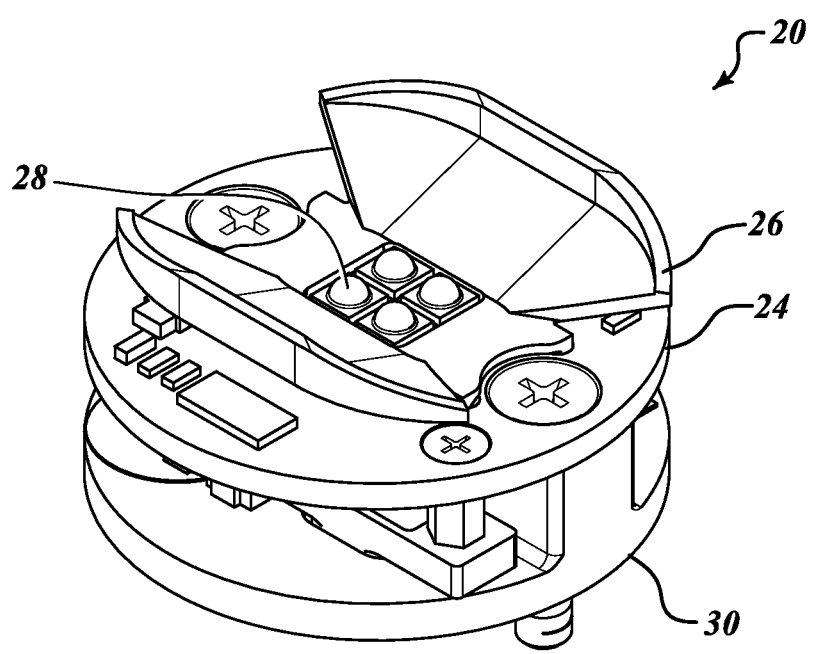
FIG. 1 is a perspective view of a light module formed in accordance with an embodiment of the present invention.
Figure 2:
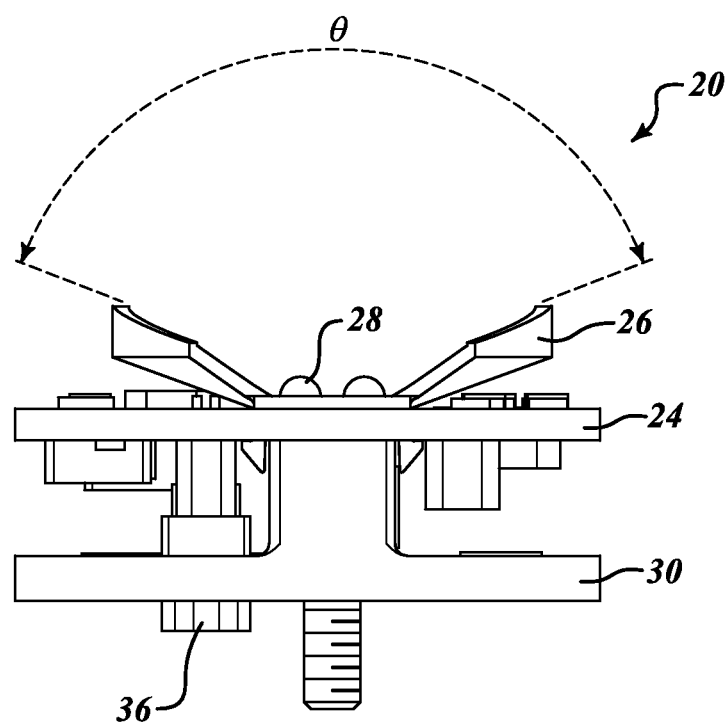
FIG. 2 is a side view of the light module of FIG. 1 showing an angular range of illumination.
Figure 3:
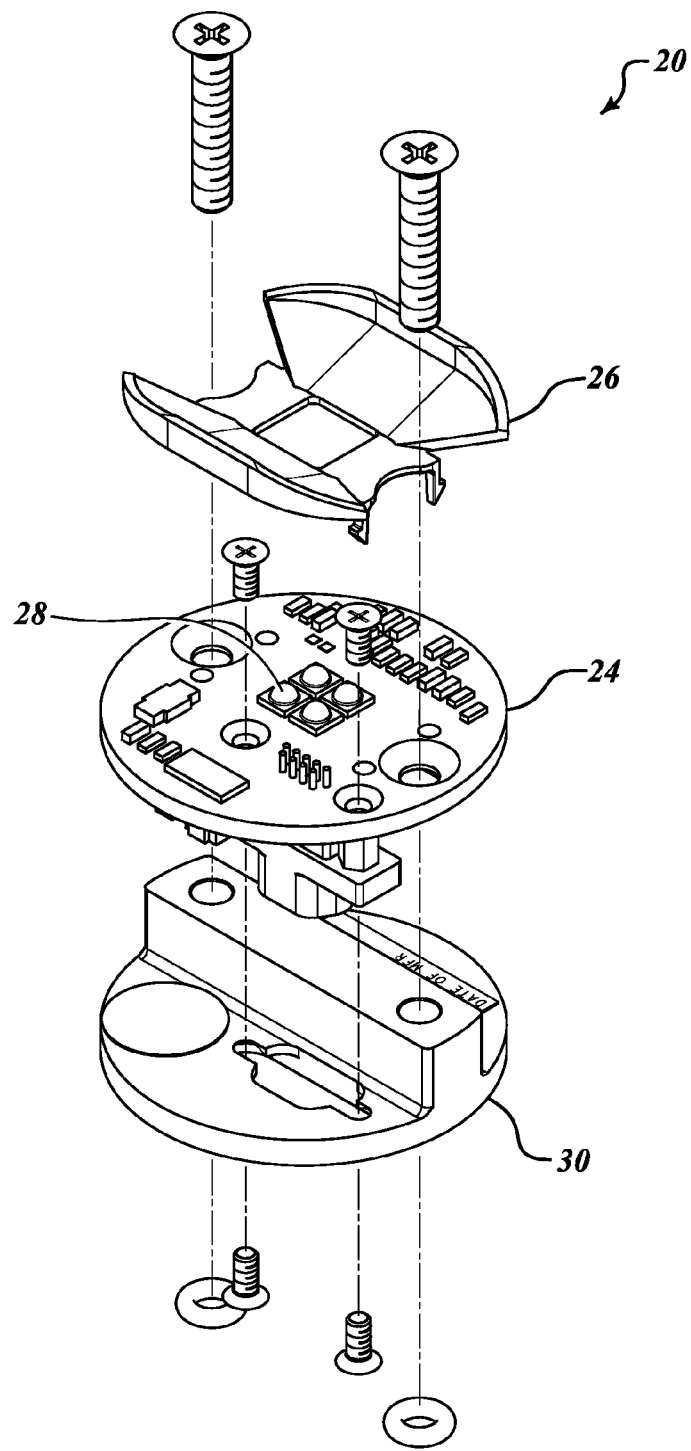
FIG. 3 is an exploded view of the light module of FIG. 1.

As shown in FIGS. 1-3, an exemplary light module 20 includes a single printed circuit board (PCB) 24 that receives one or more light emitting diodes (LEDs) 28. A reflector 26 allows light emitted from the LEDs 28 within a predefined dihedral angle θ relative to a horizontal plane. In one embodiment, the angle θ adheres to a particular requirement. For example according to the FARs, the rear position light must show unbroken white light in a range spanning from 70 degrees to the right of a longitudinal axis of the aircraft to 70 deg. to the left of the longitudinal axis, as viewed when looking aft along the longitudinal axis. Located behind the PCB 24 opposite the LEDs 28 is a heat sink 30 that bolts to the PCB 24. A plug 36 mounts to the PCB 24 through the heat sink 30.

Figures 1, 4:
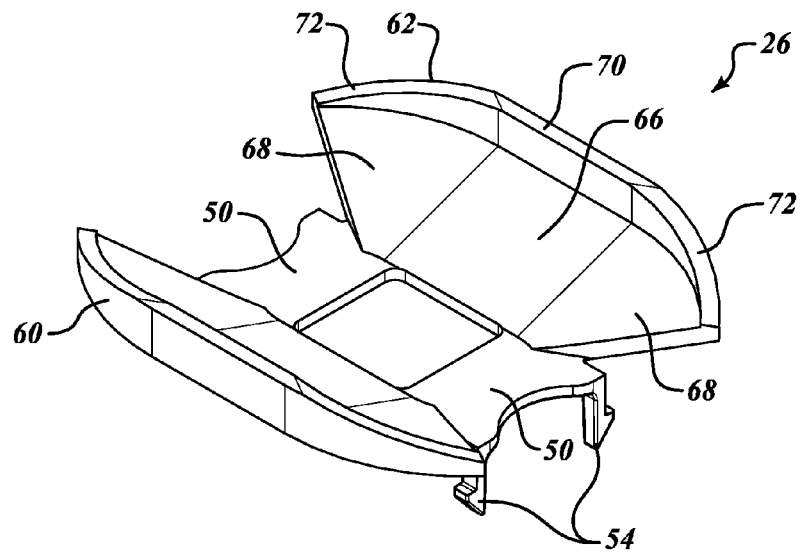
Figures 2, 4:
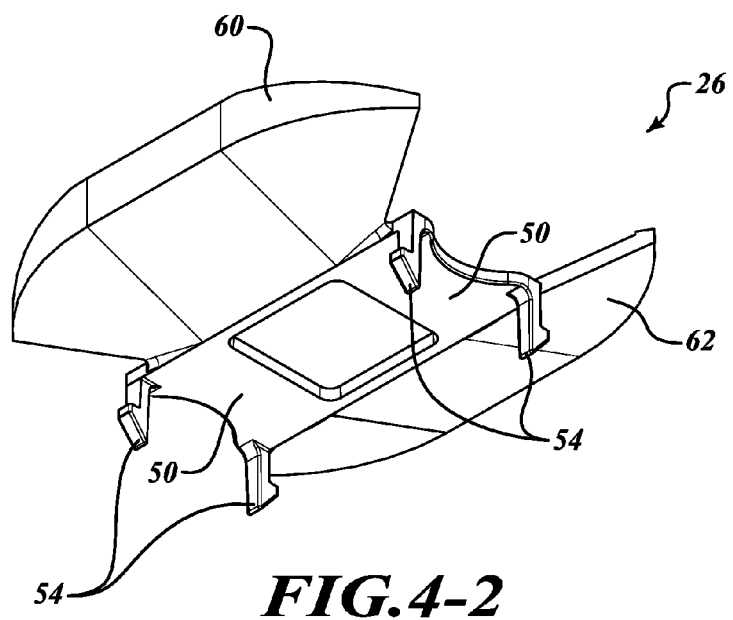

As shown in FIGS. 4-1 and 4-2, the reflector 26 includes a base section 50 that includes a cavity for receiving the LEDs 28 when the reflector 26 is mounted to the PCB 24. The reflector 26 mounts to the PCB 24 with snap fit attachment devices 54. The snap fit attachment devices 54 are received through cavities in the PCB 24. It can be appreciated that other mounting attachment means can be used for attaching the reflector 26 to the PCB 24, such as fasteners or adhesives. At least a top surface of the base section 50 is coated with a reflective material for reflecting light emitted by the LEDs 28.

The reflector 26 also includes first and second angled reflector sections 60, 62 that either mount to longitudinal sides of the base section 50 or are monolithically formed with the base section 50. A top surface of the first and second angled reflector sections 60, 62 are coated with a reflective material for reflecting light emitted by the LEDs 28. In one embodiment, the core material of the sections 50, 60, 62 includes a molded or extruded polyetherimide (PEI) thermoplastic compound or comparable material. The reflective material applied to the PEI includes aluminum (Al) that is applied using a known sputtering process. A protective top coating is applied over the Al. The top coating includes hexamethydisiloxane (HMDSO). The reflectivity of the reflective material is at least 85% depending upon the intensity of the LEDs 28 and the desired intensity for the light module 20.

Each of the first and second angled reflector sections 60, 62 included three sections; a roughly rectangular center section 66 and two roughly triangular end sections 68 that are located adjacent to the center section 66. A first edge of the sections 66, 68 contact the base section 50. Located on a second edge of the sections 66, 68 that is opposite the first edge are raised wall sections 70, 72. The raised wall section 70 is connected to the center section 66. The raised wall section 72 start at same height as the raised wall section 70 at the point where the raised wall sections 70, 72 meet. The raised wall sections 70, 72 then are tapered to an outer edge. In one embodiment, the sections 66, 68, 70 have different angles relative to one another.

Figure 5:
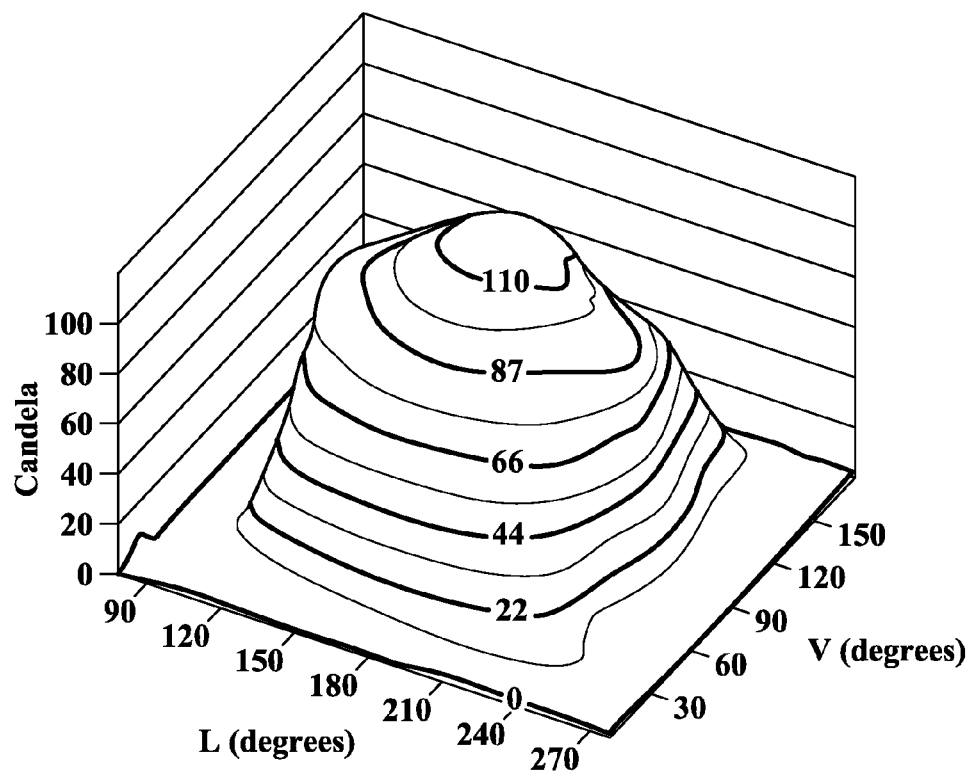
FIG. 5 illustrates an illumination pattern provided by the device shown in FIGS. 1-4.

FIG. 5 illustrates an exemplary illumination pattern produced by the light module shown in FIGS. 1-4.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A rear position light module for an aircraft having a first plane, the rear position light module comprising:
    only a single printed circuit board (PCB);
    at least one light emitting diode (LED) attached to a first surface of the PCB; and
    a single reflector and baffle device attached to the PCB, the single reflector and baffle device configured to provide a single illumination pattern having a predefined angular pattern in the first plane,
    wherein the single illumination pattern has approximately a 70 degree span in the first plane and approximately a 180 degree span in a second plane, the second plane being perpendicular to the first plane and being parallel to a lift axis of the aircraft,
    wherein the single reflector and baffle device provides the single illumination pattern without a lens portion and any paint or ceramic material located on the lens portion of the single reflector and baffle device.

2. The module of claim 1, wherein the predefined angular pattern in the first plane is configured to provide an illumination pattern that does not overlap with light illuminated by port and starboard position lights of the aircraft.

3. The module of claim 1, wherein the single reflector and baffle device comprises:
    a base section being planar, the base section comprises a cavity;
    first and second side sections attached to a first surface of the base section on opposing sides of the cavity, the first and second side sections intersect the first plane but not the second plane; and
    a plurality of attachment devices attached to the base section,
    wherein the attachment devices are configured to be removeably received by the PCB.

4. The module of claim 3, wherein the attachment devices comprise snap fittings configured to engage with the PCB.

5. The module of claim 3, wherein the single reflector and baffle device comprises a thermoplastic material at least partially coated with a reflecting material.

6. The module of claim 5, wherein the reflecting material is at least partially coated with a protection coating.

7. The module of claim 4, wherein the snap fittings are configured to be removable received by the PCB.

8. The module of claim 3, wherein the attachment devices comprise at least one of a fastener or an adhesive that are located so as not to obstruct the illumination pattern.

9. The module of claim 1, further comprising a heat sink attached to a second surface of the PCB, the heat sink being configured to take away heat produced by the LED.

10. A rear position light assembly comprising a plurality of rear position light modules for an aircraft, each rear position light module having a first plane, each rear position light module comprising:
    a single printed circuit board (PCB);
    at least one light emitting diode attached to a first surface of the PCB; and
    a single reflector and baffle device attached to the PCB, the single reflector and baffle device configured to provide only a single illumination pattern having a predefined angular pattern in the first plane,
    wherein the single illumination pattern has approximately a 70 degree span in the first plane and approximately a 180 degree span in a second plane, the second plane being perpendicular to the first plane and being parallel to a lift axis of the aircraft,
    wherein the single reflector and baffle device provides the single illumination pattern without a lens portion and any paint or ceramic material located on the lens portion of the single reflector and baffle device.

* * * * *